US008913575B2

(12) United States Patent
Pedersen et al.

(10) Patent No.: US 8,913,575 B2
(45) Date of Patent: Dec. 16, 2014

(54) RELEASING A RADIO RESOURCE (E.G. PRIMARY COMPONENT CARRIER) BASED ON CAPACITIES OF BASE STATIONS

(75) Inventors: Klaus I. Pedersen, Aalborg (DK); Luis Garcia, Aalborg (DK); Gustavo Wagner, Aalborg (DK)

(73) Assignee: Nokia Siemens Networks Oy, Espoo (FI)

( * ) Notice: Subject to any disclaimer, the term of this patent is extended or adjusted under 35 U.S.C. 154(b) by 137 days.

(21) Appl. No.: 13/639,360

(22) PCT Filed: Apr. 8, 2010

(86) PCT No.: PCT/EP2010/054647
§ 371 (c)(1),
(2), (4) Date: Feb. 20, 2013

(87) PCT Pub. No.: WO2011/124255
PCT Pub. Date: Oct. 13, 2011

(65) Prior Publication Data
US 2013/0142133 A1    Jun. 6, 2013

(51) Int. Cl.
*H04W 4/00* (2009.01)
*H04W 72/04* (2009.01)
*H04W 16/10* (2009.01)
*G08C 17/00* (2006.01)
*H04W 24/02* (2009.01)

(52) U.S. Cl.
CPC .......... *H04W 72/0426* (2013.01); *H04W 16/10* (2013.01); *H04W 24/02* (2013.01)
USPC .......................................... 370/329; 370/311

(58) Field of Classification Search
None
See application file for complete search history.

(56) References Cited

U.S. PATENT DOCUMENTS

| 2010/0195635 | A1* | 8/2010 | Maeda | 370/338 |
| 2011/0249558 | A1* | 10/2011 | Raaf et al. | 370/237 |
| 2011/0300856 | A1* | 12/2011 | Aminaka | 455/422.1 |

FOREIGN PATENT DOCUMENTS

| EP | 2 114 093 A1 | 11/2009 | |
| EP | 2114093 A1 * | 11/2009 | ............ H04W 24/02 |
| EP | 2 141 947 A1 | 1/2010 | |
| EP | 2141947 A1 * | 1/2010 | ............ H04W 24/02 |

OTHER PUBLICATIONS

R1-090235, 3GPP TSG RAN WG1 #55-bis Meeting, Ljubljana, Slovenia, Jan. 12-16, 2009, "Use of Background Interference Matrix for Autonomous Component Carrier Selection for LTE-Advanced", Nokia Siemens Networks, et al., 7 pgs.
R1-091779, 3GPP TSG RAN WG1 #57 Meeting, US, San Francisco, May 4-8, 2009, "Primary Component Carrier Selection, Monitoring, and Recovery", Nokia Siemens Networks, et al., 7 pgs.
Garcia, Luis G., et al., "Autonomous Component Carrier Selection: Interference Management in Local Area Environments for LTE-Advanced", © 2009 IEEE, 7 pgs.
Mogensen, Preben, et al., "LTE Capacity Compared to the Shannon Bound", © 2007 IEEE, 5 pgs.

* cited by examiner

*Primary Examiner* — Clemence Han
(74) *Attorney, Agent, or Firm* — Harrington & Smith

(57) ABSTRACT

The present invention relates to optimized radio resource utilization in a cellular telecommunication system. A base station of such a system evaluate a capacity metric of the base station and capacity metrics of neighboring base stations. In response to detecting that the capacity metric of the base station is below a threshold with respect to the capacity metrics of the neighboring base stations, the base station enters a stand-by mode and releases its radio resources that essentially define a cell associated with the base station so that the released radio resources become available for allocation to at least one of the neighboring base stations.

26 Claims, 3 Drawing Sheets

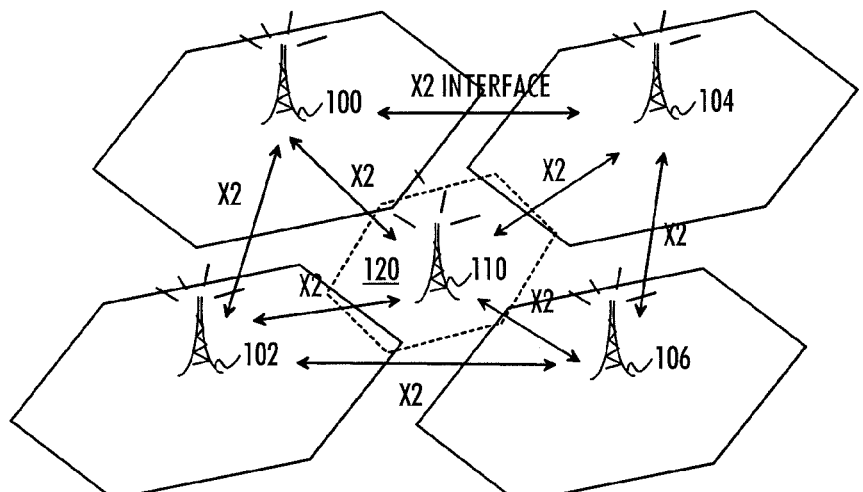
Fig 1A
RADIO RESOURCE AVAILABILITY
| ENB 110 INACTIVE | BS 110 ACTIVE |
|---|---|
| ENB 100: FULL | ENB 100: REDUCED |
| ENB 102: FULL | ENB 102: REDUCED |
| ENB 104: FULL | ENB 104: REDUCED |
| ENB 106: FULL | ENB 106: REDUCED |
Fig 1B
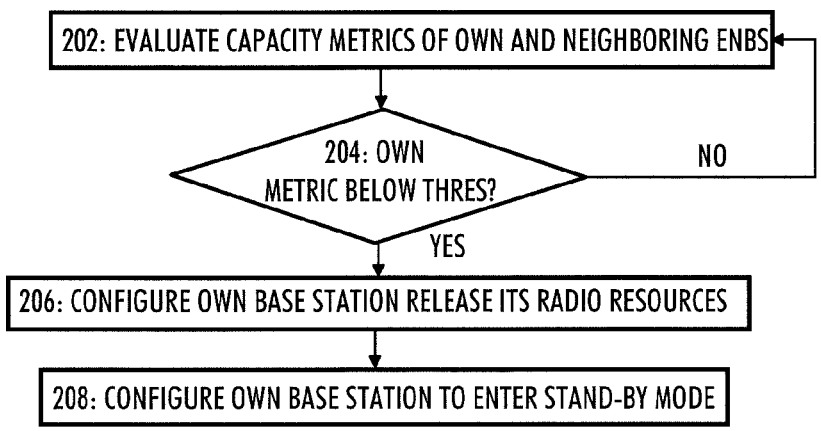
Fig 2

RELEASING A RADIO RESOURCE (E.G. PRIMARY COMPONENT CARRIER) BASED ON CAPACITIES OF BASE STATIONS

FIELD

The invention relates to the field of cellular radio telecommunications and, particularly, to efficient utilization of radio resources.

BACKGROUND

In present 3GPP ($3^{rd}$ Generation Partnership Project) specifications for a long-term evolution (advanced) of UMTS (Universal Mobile Telecommunication system, there has been proposed that each cell of a radio access network selects automatically one component carrier as its primary component carrier (PCC) (sometimes called a base carrier) when a base station associated with the cell is powered on. The base station in this context generally refers to a femto cell base station or an enhanced home node B (HeNB). Such HeNBs are deployed in an ad hoc manner in the coverage area of an operator radio access network, i.e. they typically are not part of operators network planning. The PCC essentially defines the cell, as it defines a frequency band of the cell where the HeNB communicates its signals, e.g. a physical layer cell identifier. Powering up a new HeNB automatically results in allocation of the PCC to the HeNB, which may take resources from neighboring eNBs. This may result in sub-optimal resource allocation.

BRIEF DESCRIPTION

According to an aspect of the present invention, there is provided a method as specified in claim 1.

According to another aspect of the present invention, there is provided an apparatus as specified in claim 12.

According to another aspect of the present invention, there are provided apparatuses as specified in claims 24 and 25.

According to yet another aspect of the present invention, there is provided a computer program product embodied on a computer readable distribution medium as specified in claim 26.

Embodiments of the invention are defined in the dependent claims.

LIST OF DRAWINGS

Embodiments of the present invention are described below, by way of example only, with reference to the accompanying drawings, in which FIG. 1A illustrates a communication scenario for cellular communications according to embodiments of the invention;

FIG. 1B illustrates a radio resource utilization scenario related to embodiments of the present invention;

FIG. 2 illustrates a process for capacity evaluation according to an embodiment of the invention;

DESCRIPTION OF EMBODIMENTS

Figure 3:
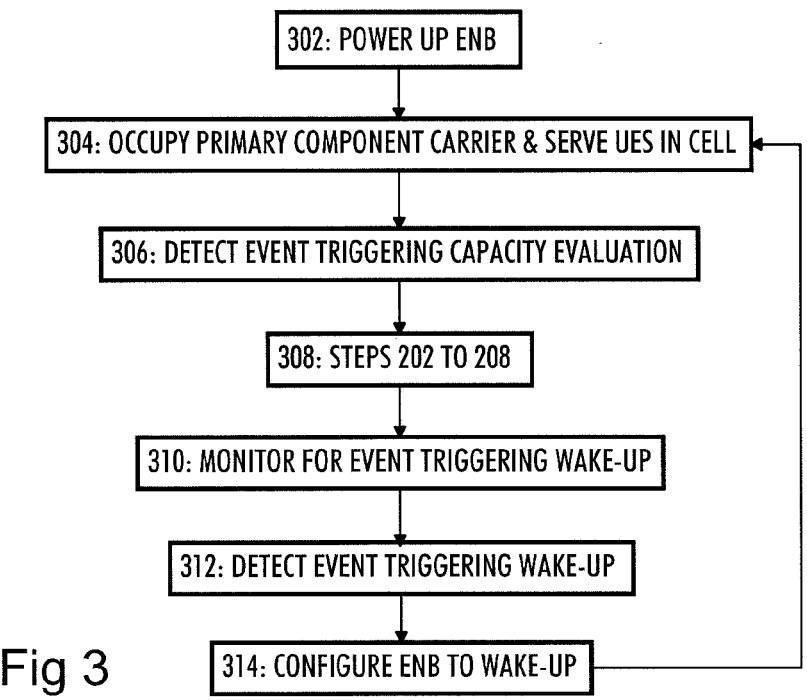
FIG. 3 illustrates operation of a base station apparatus according to an embodiment in more detail.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Further, word "comprising" is to be understood not to limit described embodiments to consist only those features that are actually described. Instead, the described embodiments may include other features and/or components that have not been specifically mentioned.

A general layout of a cellular telecommunication system providing voice and data transfer services to mobile terminals is illustrated in FIG. 1A. The cellular telecommunication system may be an evolution version of the $3^{rd}$ generation mobile telecommunication system, e.g. the UMTS, UMTS LTE, or UMTS LTE Advanced. The present invention is not, however, limited to any one of these cellular telecommunication systems, and its principles may be applied to any wireless communication system. Referring to FIG. 1A, a base station network comprises base stations 100, 102, 104, 106, 110 that provide wireless communication services within their coverage areas known as cells, e.g. cell 120. The base stations are able to communicate with each other through communication interfaces established between the base stations 100 to 110 (X2 interfaces in the UMTS LTE and LTE Advanced). The interfaces may be wired or wireless. Each base station is further configured to communicate with other parts of the cellular telecommunication system, e.g. operation and maintenance servers, mobility management entities, etc., through other interfaces (S1 interface in the UMTS LTE). User data communicated through the base station network is routed through gateway nodes of the cellular telecommunication system to other parts of the cellular telecommunication system and to other networks (e.g. the Internet).

The cellular telecommunication system may support flexible spectrum utilization and self-organizing network, wherein radio resources are adaptively distributed amongst neighboring base stations (or enhanced Node B's, eNB) and wherein new eNBs may be added to the network by simply powering-up a new eNB. Upon detection of the new eNB, the cellular network adapts the neighboring base stations to accommodate the new eNB and reserves radio resource for the new eNB. When the eNB is shut down, the cellular network utilizes the radio resources released by the disabled eNB in order to ensure optimum system capacity and radio resource utilization. The base stations 100 to 110 to which embodiments of the invention may be applied may be fixed base stations forming part of network planning of the network operator, or they may be home eNBs that are used for establishing additional coverage areas, e.g. pico or femto cells, within the coverage area of the fixed base stations. Such pico or femto cells may be used to established a cellular network within a building, for example. Naturally some of the base stations 100 to 110 may be fixed eNBs while others are home eNBs (HeNB) forming the pico or femto cells.

Each eNB has a radio carrier which essentially defines a cell associated with the eNB, e.g. the radio carrier may be unique for the eNB at least amongst the neighboring base stations. Each neighboring base station may be distinguished from other neighboring base stations by its radio carrier, which is commonly known as a primary component carrier (PCC). The PCC is used to carry downlink data and control signals to user equipment (UE) served by the eNB. However, in some network deployment scenarios, the PCC may be shared by a plurality of neighboring base stations. In case of high traffic demand in the cell, additional component carriers (secondary component carriers, SCC) may be allocated to the eNB. FIG. 1B illustrates a potential problem that arises from the requirement that each eNB is entitled to have a PCC among the neighboring eNBs. Let us consider the effect of powering-up the eNB 110 on neighboring eNBs 100 to 106. When the eNB 110 is powered up, it negotiates with other network elements about the PCC allocation. Upon receiving the PCC allocation, the eNB 110 reserves a frequency band associated with the PCC. The neighboring eNBs have their PCCs on other frequency bands, but the PCC of the new eNB 110 reduces the number of available SCCs for the neighboring eNBs, thereby reducing their maximum capacity to server UEs. Even if the neighboring eNBs 100 to 106 are assigned with SCCs on the same frequency band as the PCC of the eNB 110, their maximum capacity is still reduced, as the PCC of the eNB 110 on the same band as the SCCs of the neighboring eNBs 100 to 106 causes interference towards the neighboring eNBs 100 to 106, thereby reducing the maximum available capacity of such SCC and, thus, the total maximum capacity of the neighboring eNBs. In some situations, the newly added eNB 110 and its PCC reservation decreases the overall system performance instead of improving it, which may lead to sub-optimal performance.

Embodiments of the present invention aim to solve the problem by configuring the network to determine whether a given eNB assigned with a PCC (or another radio resource essentially defining the eNB) improves or degrades the performance of the whole system and to configure the eNB to enter a stand-by mode and to release the PCC, if the eNB causes more harm than good for the system efficiency. FIG. 2 illustrates a process for determining effective utilization of radio resources in the cellular telecommunication system. The process may be carried out in a processor or another circuitry in an eNB of the cellular telecommunication system, e.g. the eNB 110. The process may be defined by a computer program product configuring the processor to execute the process, when the processor reads the computer program product from a computer-readable medium, such as a tangible memory chip.

Referring to FIG. 2, the eNB carrying out the process evaluates in block 202 its own capacity metric and capacity metrics of neighboring eNBs. The list of neighboring eNBs may be provided to the evaluating eNB 110 through the X2 interface and/or through measurement reports received from UEs served by the evaluating eNB 110. The evaluated capacity metrics may include maximum achievable capacities of each eNB in current communication environment, as will be described below in greater detail. In block 204, the evaluating eNB compares its own capacity metric with a threshold that may be calculated from the capacity metrics of the neighboring eNBs. If the capacity metric of the evaluating eNB 110 is above the threshold, indicating good performance of the evaluating eNB in terms of overall system capacity, the process stops or returns (after some time period) to block 202 for re-evaluation. On the other hand, if the capacity metric of the evaluating eNB 110 is above the threshold, indicating poor performance of the evaluating eNB 110 in terms of overall system capacity, the process proceeds to block 206 where the evaluating eNB is configured to release its PCC (and possible SCCs). Further, the evaluating eNB is configured to enter a stand-by mode in block 208.

An advantage of this embodiment is that it enables the eNB to evaluate whether its presence improves or degrades the system performance. If the eNB determines that it degrades the performance of the neighboring eNBs more than what is considered tolerable, it releases its radio resources to become available for allocation to at least one of the neighboring base stations and enters the stand-by mode so as to reduce interference towards the neighboring base stations, thereby improving their maximum capacities.

The evaluation process of FIG. 2 may be executed periodically or upon detecting an event that triggers the evaluation. FIG. 3 illustrates the operation of the evaluating eNB before and after the capacity evaluation of the process of FIG. 2. Some steps of the process of FIG. 3 may be carried out by the processor defined by a computer program product, while other steps may include also mechanical or non-software-defined electronic operations. Referring to FIG. 3, the eNB 110 is powered up in block 302, and in block 304 the eNB 304 occupies a PCC allocated to the eNB. Block 304 may include communication with other parts of the cellular telecommunication system so as to determine the PCC allocation as part of the flexible spectrum utilization and self-organizing network. The eNB carries out further setup procedures common to the start-up of the eNB and starts serving UEs located within the coverage area of the eNB.

In block 306, the eNB detects an event triggering the capacity evaluation. The event may be detection of expiry of a determined time period between consecutive capacity evaluation procedures, detection of the fact that the eNB currently serves no UEs, detection of the fact that the eNB currently suffers from interference higher than a determined threshold, thereby limiting the maximum capacity of the eNB, detection that the eNB is the greatest source of interference to neighboring eNBs, or detection of another event. The detection of interference may be based on a background interference matrix (BIM) maintained in every eNB, as known in the art. The BIM contains interference values in the form of signal-to-interference-plus-noise ratio (SINR) values or carrier-to-interference ratio (C/I) values that both describe mutual interference between the eNB and neighboring eNBs in case the interfered cell and the interfering cell use the same component carrier simultaneously. The BIM may define both incoming interference (from each neighboring eNB) and outgoing interference (towards each neighboring eNB). The BIM may be constructed as follows. For each active UE connected to the cell, reference signal received power (RSRP) measurements are reported. These measurements are conducted both towards a serving cell and surrounding cells. The conditional C/I or SINR, expressed in decibels, describe the RSRP difference between the serving cell and the surrounding cells. Hence, based on the RSRP measurements reported from the different UEs, an empirical C/I or SINR distribution is built locally within each eNB. The C/I value stored in the BIM for each surrounding cell is the value corresponding to a certain outage of e.g. 90%. The values in the locally stored BIM can be updated either periodically or in response to a determined event. As component carriers are likely to experience the same path loss conditions, the BIM is independent of the component carrier as it is only based on path-loss type of measurements (RSRP), i.e. it is sufficient for the UEs to measure only a single component carrier per cell. The eNBs may share their BIMs so that every neighboring eNB knows not only its own incoming and outgoing interference but optionally also corresponding interference figures for the neighboring eNBs. Accordingly, the BIM stored in an eNB may have the following form:

|      | eNB1   | eNB2   | eNB3   | eNB4  |
|------|--------|--------|--------|-------|
| eNB1 | —      | SINR1  | SINR2  | SINR3 |
| eNB2 | SINR4  | —      | SINR5  | SINR6 |
| eNB3 | SINR7  | SINR8  | —      | SINR9 |
| eNB4 | SINR10 | SINR11 | SINR12 | —     | where a column illustrates interference a particular eNB causes towards other eNBs and where a row illustrates interference other eNBs cause towards a particular eNB.

In block 308, steps 202 to 208 of FIG. 2 are carried out. From block 208, the process moves to block 310 after the eNB has entered the stand-by mode. The eNB may still maintain its communication channels towards neighboring eNBs (the X2 interface) and/or its radio interface (at least uplink, optionally also downlink) active to enable reception of a signal triggering the wake-up of the eNB from the stand-by mode. The signals triggering the wake-up may include a handover request received from a neighboring eNB, an association request received from UE close to the eNB requesting to be served by the eNB (similar to association requests known in IEEE 802.11 networks), and/or another types of wake-up signals. Upon detection of such an event triggering the wake-up in block 312, the eNB is configured to transfer from the stand-by mode into an operational mode in block 314. During the transition to the operational mode, the eNB returns to block 304 where it occupies its PCC which may be the same PCC already allocated to the eNB or a different PCC. If the PCC resource is currently occupied by at least one of the neighboring as an SCC, the eNB waking up may be configured to signal to the neighboring eNBs (at least those occupying the PCC resource) the fact that it will occupy the PCC resource. This signal may trigger the neighboring eNBs to release the resource (their SCC resource) or at least to lower transmit power (or to lower interference otherwise) in the resource.

Figure 4:
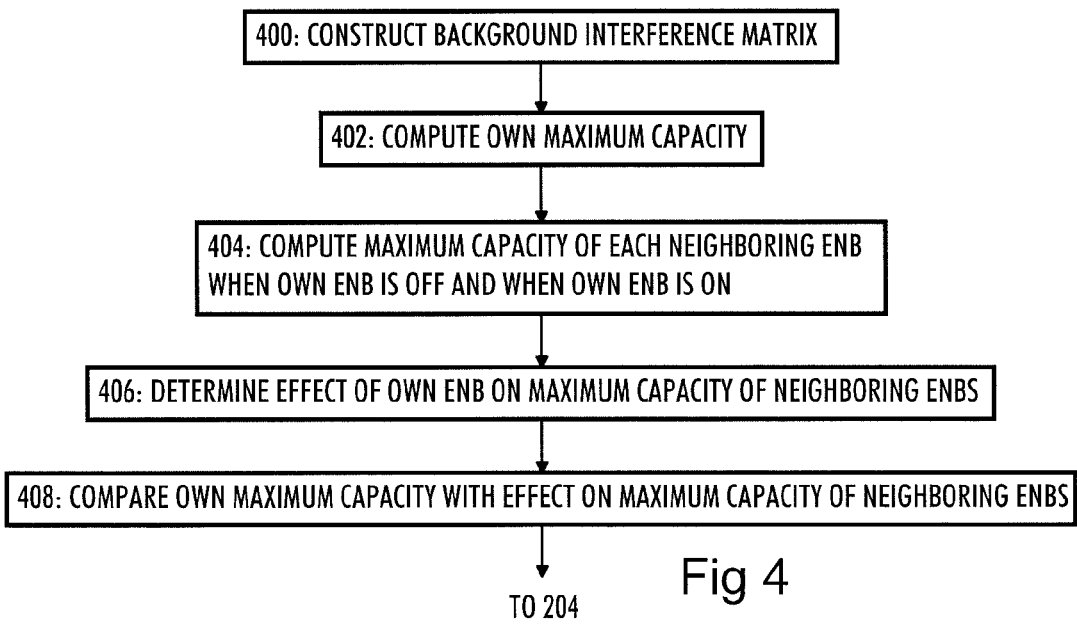
FIG. 4 illustrates a process for carrying out step 202 of FIG. 2 in more detail.

Let us now discuss the capacity evaluation, i.e. block 202 of FIG. 2, in more detail. The capacity metrics calculated in block 202 may include capacity (equivalent to throughput) estimates, as will be described below, but instead of capacity estimates other metrics proportional to the capacity may be used. Such other metrics may include maximum data rate, good-put, and other metrics that are proportional to the capacity, i.e. describe the capacity of the eNB. Referring to FIG. 4, the eNB carrying out the capacity evaluation constructs in block 400 the above BIM describing on interference coupling between the evaluating eNB and neighboring eNBs. The BIM may be updated periodically as the eNB receives further RSRP reports from UEs. Let us now assume in this exemplary embodiment that the BIM describes the interference coupling with SINR values. In block 402, the eNB calculates its own maximum capacity by first determining the overall SINR. The overall SINR may be derived by aggregating the interference caused by the neighboring base stations and calculating the total SINR from the transmission power of the eNB and the aggregated interference. The overall SINR value may then be inserted in the following (modified) Shannon capacity equation:

$$C_{own} = BW_{eff} \cdot \eta \cdot \log_2(1 + SINR/SINR_{eff}), \quad (1)$$

where $BW_{eff}$ is bandwidth efficiency of the system taking into account the implementation losses in terms of the bandwidth, $\eta$ is a correction factor which may be set to 1 or to another factor, SINR is the overall SINR value and $SINR_{eff}$ is used for adjusting the overall SINR value according to the SINR implementation efficiency. Instead of this modified Shannon formula, a regular Shannon formula ($C_{own} = BW \log_2(1+SINR)$ where BW is the bandwidth of the PCC allocated to the eNB) may be used, although it has been discussed in P. Mogensen et al., "LTE Capacity Compared to the Shannon Bound," IEEE Proc. VTC, April 2007, pp. 1234-38 that in practice the regular Shannon bound cannot be reached due to several implementation issues. Equation (1) represents these loss mechanisms accurately and, thus, provides an improved estimate of the capacity. The article discusses the selection of the effective bandwidth parameter $BW_{eff}$ on page 1235, under "A. System bandwidth efficiency", selection of the $SNR_{eff}$ and correction factor parameters on pages 1235-1237, under "B. SNR efficiency". The article focuses on implementation efficiency of the LTE system so the teachings of the article may be used directly when the capacity evaluation according to embodiments of the present invention is carried out in the eNB of the LTE system. However, the teachings of the article may be adapted to other cellular systems as well. It should be noted that Equation (1) above uses SINR instead of SNR (signal-to-noise ratio) used in Equation (3) of the article.

In block 404, the eNB computes a maximum capacity of each neighboring base station in two cases: when the evaluating eNB is in the operative mode and when the evaluating eNB is in the stand-by mode. The capacity when the evaluating eNB is on, $C^{(on)}$, may be calculated with Equation (1), where the SINR accounts for the aggregated interference experienced by the eNB for which the capacity estimation is made. The aggregated interference includes interference from the evaluating eNB and may include the interference from other neighboring eNBs. The capacity when the evaluating eNB is off, $C^{(off)}$, may be calculated with Equation (1), where the SINR accounts for the aggregated interference from the neighboring eNBs other than the evaluating eNB, because the evaluating eNB is now assumed to be switched off. In an embodiment where the evaluating eNB does not have the full BIM, i.e. it does not have information on the SINRs between the neighboring eNBs (it only knows incoming and outgoing SINR between the evaluating SINR and each neighboring eNB), $C^{(off)}$ is computed for each neighboring eNB with the assumption that the PCC resource is free of interference and, therefore, it equals the maximum achievable spectrum efficiency of the system (known value). The maximum achievable spectrum efficiency is determined from the known limits set by the implementation of radio frequency (RF) components and the highest modulation and coding scheme available. Similarly, $C^{(on)}$ may be calculated by analyzing only the outgoing interference from the evaluating eNB towards the eNB for which the capacity estimation is made.

When $C^{(on)}$ and $C^{(off)}$ are computed for all neighboring eNBs, the capacity properties of the evaluating eNB are compared with capacity properties of the neighboring eNBs in blocks 406 and 408 by using the following equation:

$$\sum_{s \in S} \alpha_s (C_s^{(off)} - C_s^{(on)}) \geq \frac{1}{\beta} C_{own}, \quad (2)$$

where S is the set of neighboring eNBs taken into account, $\alpha_s$ (having a value between 0 and 1) is a weighting factor for each neighboring eNB (the same for every eNB in the simplest scenario). When $\alpha_s$ is set to zero, it implies that the evaluating node is known to cause little or no impact on the neighboring node and most of its own capacity is degraded by interference stemming from other eNBs. As $\alpha_s$ approaches one, the evaluating node is probably the main source of interference towards the neighboring eNBs and in the absence of the evaluating node, the channel may be considered nearly free of interference.

Factor $\beta$ is an adjustment that may be made to reflect the recent history of served traffic $[0, \infty]$. In the simplest case $\beta=1$. Setting $\beta$ close to zero basically disables the switching to the stand-by mode, and it reflects a high traffic scenario in the cell of the evaluating eNB, whereas a high value facilitates the PCC abdication and corresponds to very low traffic.

The evaluating eNB is switched off if the total capacity degradation of the neighboring eNBs is higher than the maximum capacity of the evaluating eNB. However, if it is considered that the evaluating eNB should be kept operational because of coverage reasons with the expense of decreased system capacity, for example, α and/or β may be set to a value close to zero. On the other hand, if it is considered that avoiding the capacity degradation of the neighboring eNBs overrules the capacity gained with the evaluating eNB, α and/or β may be set to a high value (one or β even higher). To describe the operation of the computation of Equation (2), a capacity degradation value or the effect of the evaluating eNB on the maximum capacity is calculated in block 406 for each neighboring eNB from the maximum achievable capacity when the base station is in the operative mode ($C_s^{(on)}$) and from an achievable capacity when the base station is in the stand-by mode ($C_s^{(off)}$) by calculating the difference ($C_s^{(off)} - C_s^{(on)}$). Then, the capacity degradation values of the neighboring eNBs are summed. Then, the comparison of Equation (2) is made in order to compare the maximum capacity of the evaluating eNB with the aggregated capacity degradation value so as to determine whether the capacity degradation caused by the evaluating eNB in the operative mode is within a preset tolerance range (defined by β). If the result of the comparison of Equation (2) is true, i.e. the capacity degradation of the neighboring eNBs is higher than the maximum capacity of the evaluating eNB, the evaluating eNB determines that it degrades the overall system capacity and should release its PCC for use by the neighboring eNBs. As a consequence, the process enters block 206. On the other hand, if the result of the comparison of Equation (2) is false, i.e. the capacity degradation of the neighboring eNBs is lower than the maximum capacity of the evaluating eNB, the evaluating eNB determines that it improves the overall system capacity and should maintain its PCC. Then, the process returns to block 202 (or 304).

Instead of calculating Equation (1), the actual computations for different SINR values may be carried out beforehand, and a database may be stored in each eNB. The database then maps the SINR and bandwidth values to corresponding capacity (or throughput) values. This simplifies the implementational complexity and computational requirements of the capacity evaluation.

If the system is configured such that the PCC of the evaluating eNB precludes the utilization of the frequency band of the PCC for the neighboring eNBs, then $C^{(on)}=0$ in Equation (2) meaning that the evaluating eNB takes away all the capacity of the neighboring eNBs on the frequency band of the PCC. Then, Equation (2) determines whether it is more advantageous to share the PCC of the evaluating eNB amongst the neighboring eNBs or to reserve it for dedicated use by the evaluating eNB (weighted with parameters α and β).

RSRP measurements received from the UEs may also be used to determine whether disabling the evaluating eNB causes coverage problems in the cellular network. If the RSRP measurements indicate UEs that are able receive the downlink reference signal at an acceptable level only from the evaluating eNB, then the capacity evaluation and the stand-by mode of the eNB may be prevented to avoid coverage problems. For this purpose, at least one RSRP safety margin may be defined. If the RSRP reports received from at least one UE indicate that only one eNB provides the reference signal at a reception power higher than the safety margin, then the capacity evaluation of that eNB is prevented and it cannot be configured to the stand-by mode.

Figure 5:
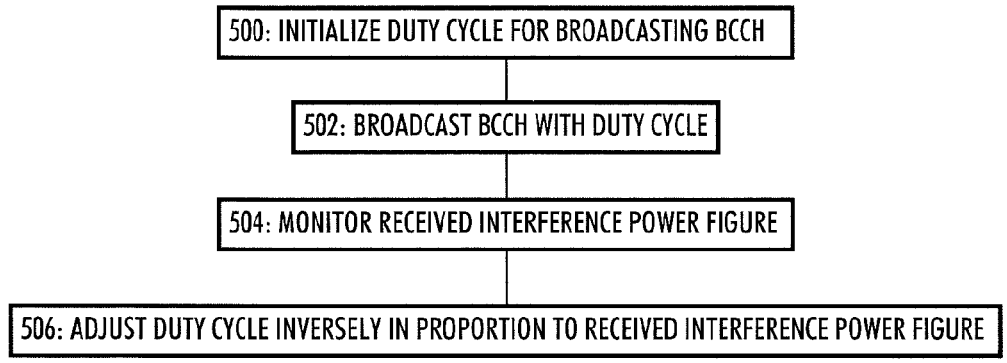
FIG. 5 illustrates a process for use in a base station when the base station is in a stand-by mode.

In the stand-by mode, the eNB may be configured only to receive signals, not to transmit or broadcast anything except as a response to a received handover request, association request, etc. In another embodiment, the eNB in the stand-by mode is configured to broadcast a broadcast control channel (BCCH) and/or another control channel or channels (excluding data channels) to enable UEs to carry out measurements and to enable handovers to the hibernating eNB, if necessary. On one hand broadcasting the BCCH causes interference towards the neighboring eNBs utilizing the released PCC as an SCC, whereas disabling the broadcast of the BCCH reduces interference and power consumption. On the other hand, disabling the BCCH slows down normal access times and handover procedures. An embodiment of the present invention presents a case-sensitive manner to control the BCCH broadcasting. This embodiment is described with reference to a flow diagram of FIG. 5 describing a process that may be carried out in an eNB in the stand-by mode. This embodiment defines a duty cycle for broadcasting the BCCH, where the BCCH is broadcasted periodically for a duration determined by the duty cycle. Referring to FIG. 5, the duty cycle is initialized in block 500. The duty cycle parameter may be read from a memory unit. In block 502, the BCCH is broadcasted with the determined duty cycle dividing a determined time period to a BCCH transmission interval and a BCCH non-transmission interval. The BCCH is transmitted continuously, if the duty cycle is set to define 100% BCCH transmission interval. During the stand-by mode, the eNB may measure uplink received interference power (RIP) from uplink signals received from UEs The RIP measurement is a standardized measurement in the physical layer specifications of the UMTS LTE. Although it is an uplink measurement, it may still be used to reflect downlink interference the eNB causes in the stand-by mode. The eNB monitors the RIP value in block 504. On the basis of the RIP, the duty cycle may be adjusted in block 506 inversely in proportion to the degree of interference. In case of high interference, the duty cycle is increased so that the control channel transmission/reception periods are increased, while the duty cycle may be lowered when the hibernating eNB does not sense interference at all or only to a minor degree. This scheme enables an optimized tradeoff between the degree of transmission power savings and the access times.

Figure 6:
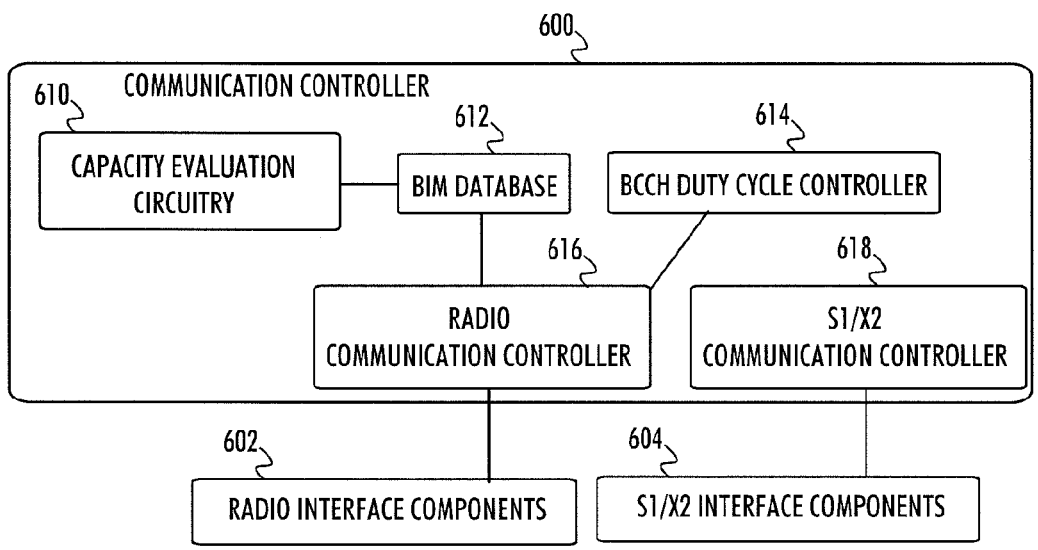
FIG. 6 illustrates a block diagram of an apparatus according to an embodiment of the invention.

FIG. 6 illustrates an exemplary structure related to an apparatus according to an embodiment of the present invention. The apparatus may be a processor or a circuitry applicable to a base station of a cellular telecommunication network, or it may be the base station of the cellular telecommunication network. The apparatus comprises radio interface components 602 comprising analog and digital circuitries needed for establishing radio links with UEs within the cell of the base station. The radio interface components 602 may include transmission and reception circuitries including an antenna or an antenna array, analog amplifiers, filters, and frequency converters, analog-to-digital and digital-to-analog converters and digital signal processing circuitries used for digital transmission and reception signal processing, e.g. modulation, coding, demodulation, detection, decoding, channel estimation, etc. When the apparatus is comprised in a base station applied to the LTE system, the apparatus further comprises S1 and X2 interface components 604 establishing wireless or wired X2 interfaces with neighboring base stations and S1 interface with other parts of the cellular network, as known from the UMTS LTE specifications.

The apparatus comprises a communication control circuitry 600 controlling the communication of the base station. The communication control circuitry 600 comprises a radio communication controller circuitry 616 controlling the radio communications and an S1/X2 communication controller circuitry 618 controlling the communication with the other elements of the cellular network. With respect to the concept of the present invention, the communication controller circuitry 600 further comprises a BIM database 612 stored in a memory unit and storing the current BIM, a capacity evaluation circuitry 610 carrying out the capacity evaluation of FIG. 2 or 4, and a BCCH duty cycle controller circuitry 614 carrying out the process of FIG. 5. In case the apparatus does not support the adaptive duty cycle for the BCCH, the circuitry 614 may be omitted. If the capacity evaluation is configured to be carried out periodically, the base station may further comprise a timer counting the duration from the previous capacity evaluation. The communication controller circuitry 600 and its sub-circuitries 610 to 618 may be realized by one or more processors configured by software. The BIM database 612 may be stored in a memory unit external to the communication controller circuitry 600. The memory unit may also store computer program products configuring the operation of the communication controller circuitry 600 and/or at least some of the sub-circuitries 610, 614 to 618. The communication controller circuitry 600 may naturally comprise other circuitries and components, but the description of such components is omitted in order not to obscure the present invention with unnecessary details.

When the base station comprising the apparatus according to an embodiment of the invention is powered up, the communication control circuitry 600 configures the S1/X2 communication controller 618 to establish connections to neighboring base stations and other parts of the cellular telecommunication system. The communication controller also configures the radio communication controller 616 to set up a PCC to start radio communication in a cell of the base station. The PCC allocation may be carried out through communication over the S1 and/or X2 interfaces, or the radio communication controller may be configured to sense the radio interface for a free PCC and occupy it. During the operation, the radio communication controller receives RSRP reports from UEs served by the base station and it updates the BIM database 612 accordingly. Upon detection of an event triggering the capacity evaluation, the capacity evaluation circuitry 610 is configured to carry out the capacity evaluation according to the process of FIG. 2 or 4. The triggering event may be the lack of served UEs (or less than a determined number of currently served UEs) detected by the radio communication controller 616, the detection from the BIM that the base station is the highest source of interference towards the neighboring base stations or that the base station suffers the highest interference and, thus, may have reduced capacity. Such events may be detected by a sub-circuitry monitoring the BIM. Monitoring for any event triggering the capacity evaluation may be triggered by the fact that the base station does not have any SCCs, i.e. the capacity evaluation may be prevented when the base station has multiple component carriers.

When the capacity evaluation circuitry 610 determines that the base station should be transferred to the stand-by state, it outputs a corresponding message to the communication controller 600 which configures the radio communication controller 616 to release the PCC and to shut down determined transceiver circuitries. The communication controller 600 may further control handover of remaining UEs served by the base station (if any) to the neighboring base stations. The S1/X2 communication controller may be configured to the stand-by state and to shut-down transmitter circuitries but to maintain reception circuitries active in case of a message triggering the wake-up. The PCC last used may be stored in a memory unit so it can be retrieved quickly when the base station should wake up.

During the stand-by mode, the radio communication controller 616 reads from the BCCH duty cycle controller 614 the current duty cycle and controls the radio interface components 602 to broadcast the BCCH with the read duty cycle. The communication controller may further receive information concerning the interference coupling between the base stations so as to update the BIM database and/or to adjust the duty cycle, as described above. The information concerning the interference coupling may be received from the neighboring base stations through the X2 interface and/or from the UEs through the radio communication controller and radio interface components. The radio communication controller may be configured to keep control channels open to enable the reception of the RSRP reports. Upon detection of the wake-up triggering event, the radio communication controller 616 is configured to retrieve the PCC from the memory unit or through the S1/X2 communication controller 618 and to set up for the operative mode. Then, the base station may continue the operation until the next capacity evaluation.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 5 may also be carried out in the form of a computer process defined by a computer program. Each step in the computer programs according to the processes of FIGS. 2 to 5 may be a separate computer software module, and the interaction of such modules carries out the processes. The computer program may be in source code form, object code form, or in some intermediate form, and it may be stored in some sort of carrier, which may be any entity or device capable of carrying the program. Such carriers include at least one of the following: a record medium, computer memory, read-only memory, electrical carrier signal, telecommunications signal, software distribution package, and any article of manufacture readable by the computer and configured to store information. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. Embodiments of the invention improve the overall system performance, for example, in local area environments where the base stations select the PCCs autonomously. Especially in dense urban network topologies, where the number of HeNBs may be large and interference coupling very strong, the present cooperation scheme renders the network less sensitive to user-dependent placement of HeNBs. 3GPP defines three operating modes for the HeNBs. The first one is called Closed Subscriber Group (CSG), where only a few dedicated UEs are allowed to be served by the HeNB. The second mode is called open or non-CSG where all UEs of a given operator are allowed to connect to the HeNB. The third mode is a hybrid mode which combines the first two. This invention report is in practice suitable for all the modes. While the embodiments are obviously applicable to the last two modes where a network of neighboring base stations serve a collective pool of UEs, the embodiments of the present invention are also applicable to the case of multiple HeNBs forming a collective CSG mode and serving together a pool of UEs in e.g. a large office.

The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    evaluating, in a base station of a cellular radio access network operating on a radio resource, a capacity metric of the base station with respect to the radio resource and capacity metrics of neighboring base stations with respect to the radio resource; and
    in response to detecting that the evaluated capacity metrics indicate that the capacity of the base station is below a threshold calculated from the capacities of the neighboring base stations on said radio resource, configuring the base station to enter a stand-by mode and to release said radio resource that defines a cell associated with the base station so that the released radio resource becomes available for allocation to at least one of the neighboring base stations.

2. The method of claim 1, wherein the radio resource to be released includes a primary component carrier which is a radio carrier always allocated to the base station when the base station is in an operative mode.

3. The method of claim 2, further comprising triggering said capacity evaluation when the base station utilizes only said primary component carrier and no secondary component carriers, wherein a secondary component carrier is a radio carrier allocated to the base stations as a supplementary radio carrier in addition to the primary component carrier.

4. The method of claim 1, wherein the capacity evaluation of the neighboring base stations comprises determining the effect of the base station operating on said radio resource on the capacity metrics of the neighboring base stations on said radio resource, and wherein the base station is configured to enter the stand-by mode and to release said radio resource in response to detecting that the base station degrades the capacities of the neighboring base stations more than what is the evaluated capacity of the base station.

5. The method of claim 1, further comprising:
    maintaining in the base station a background interference matrix comprising information on interference between the neighboring base stations and said base station; and
    triggering the capacity evaluation upon detection that the highest mutual interference in the background interference matrix is associated with the base station.

6. The method of claim 5, further comprising monitoring the capacity metric by:
    maintaining in the base station said background interference matrix;
    determining capacity properties of the base station and the neighboring base stations from the background interference matrix; and
    comparing capacity properties of the base station with capacity properties of the neighboring base stations.

7. The method of claim 6, wherein said background interference matrix comprises at least one information element describing interference towards the base station caused by the neighboring base station using the same component carrier as the base station, at least one information element describing interference towards each neighboring base station caused by the base station using the same component carrier, and information elements describing interference between neighboring base stations, the method further comprising:
    determining the capacity properties of the base station by calculating an achievable capacity from the at least one information element describing interference towards the base station;
    determining the capacity properties of the neighboring base stations by calculating for each selected neighboring base station a capacity degradation value from an achievable capacity when the base station is in an operative mode and from an achievable capacity when the base station is in the stand-by mode;
    determining whether capacity degradation caused by the base station in the operative mode is within a preset tolerance range; and
    configuring the base station to release its radio resources to enter the stand-by mode, when the capacity degradation of the neighboring base stations is not within the preset tolerance range, and configuring the base station to maintain the operative mode, if the capacity degradation of the neighboring base stations is within a preset tolerance range.

8. The method of claim 6, wherein the background interference matrix comprises information elements, said information elements being signal-to-interference-plus-noise values.

9. The method of claim 1, further comprising;
    triggering the capacity evaluation upon detection of no user terminals currently being served by the base station.

10. The method of claim 1, further comprising:
    monitoring in the stand-by mode communication interfaces of the base station for a reception of triggering event triggering a transition from the stand-by mode to an operative mode; and
    configuring the base station to transit to the operative mode and to occupy said radio resource that defines the cell.

11. The method of claim 1, further comprising:
    preventing the base station from entering the stand-by mode, when measurement reports measured by user terminals indicate that the stand-by mode of the base station causes a gap in a coverage area of a base station network comprising said base station and said neighboring base stations.

12. An apparatus comprising means for carrying out the method according to claim 1.

13. A computer program product embodied on a non-transitory distribution medium readable by a computer and comprising program instructions which, when loaded into a processor, execute the method according to claim 1.

14. An apparatus comprising:
one or more processors; and
one or more memories including computer program code, the one or more memories and the computer program code configured, with the one or more processors, to cause the apparatus to perform the following:
  evaluate a capacity metric of a base station of a cellular radio access network operating on a radio resource and capacity metrics of neighboring base stations, wherein the capacity metrics are evaluated for said radio resource; and
  in response to the capacity evaluation circuitry detecting that the capacity of the base station is below a threshold to calculated from the capacities of the neighboring base stations on said radio resource, configure the base station to enter a stand-by mode and to release said radio resource that defines a cell associated with the base station so that the released radio resource becomes available for allocation to at least one of the neighboring base stations.

15. The apparatus of claim 14, wherein the radio resource to be released includes a primary component carrier which is a radio carrier always allocated to the base station when the base station is in an operative mode.

16. The apparatus of claim 15, wherein the communication control circuitry is further configured to trigger the capacity evaluation circuitry to start said evaluation when the base station is detected to utilize only said primary component carrier and no secondary component carriers, wherein a secondary component carrier is a radio carrier allocated to the base stations as a supplementary radio carrier in addition to the primary component carrier.

17. The apparatus of claim 14, wherein the one or more memories and the computer program code are further configured, with the one or more processors, to cause the apparatus to perform:
  determine the effect of the base station operating on said radio resource on the capacity metrics of the neighboring base stations on said radio resource, and configure the base station to enter the stand-by mode and to release said radio resource in response to detecting that the base station degrades the capacities of the neighboring base stations more than what is the evaluated capacity of the base station.

18. The apparatus of claim 14, wherein the one or more memories and the computer program code are further configured, with the one or more processors, to cause the apparatus to perform:
  maintain a background interference matrix comprising information on interference between the neighboring base stations and said base station, and trigger the capacity evaluation upon detection that the highest mutual interference in the background interference matrix is associated with the base station.

19. The apparatus of claim 18, wherein the one or more memories and the computer program code are further configured, with the one or more processors, to cause the apparatus to perform:
  maintain said background interference matrix,
  determine capacity properties of the base station and the neighboring base stations from the background interference matrix, and
  compare capacity properties of the base station with capacity properties of the neighboring base stations.

20. The apparatus of claim 19, wherein said background interference matrix comprises at least one information element describing interference towards the base station caused by the neighboring base station using the same component carrier as the base station, at least one information element describing interference towards each neighboring base station caused by the base station using the same component carrier, and information elements describing interference between neighboring base stations,
  wherein the one or more memories and the computer program code are further configured, with the one or more processors, to cause the apparatus to perform:
  determine the capacity properties of the base station by calculating an achievable capacity from the at least one information element describing interference towards the base station,
  determine the capacity properties of the neighboring base stations by calculating for each selected neighboring base station a capacity degradation value from an achievable capacity when the base station is in an operative mode and from an achievable capacity when the base station is in the stand-by mode,
  determine whether capacity degradation caused by the base station in the operative mode is within a preset tolerance range, and
  configure the base station to release its radio resources to enter the stand-by mode, when the capacity degradation of the neighboring base stations is not within the preset tolerance range, and to configure the base station to maintain the operative mode, when the capacity degradation of the neighboring base stations is within the preset tolerance range.

21. The apparatus of claim 19, wherein the background interference matrix comprises information elements, said information elements being signal-to-interference-plus-noise values.

22. The apparatus of claim 14, wherein the one or more memories and the computer program code are further configured, with the one or more processors, to cause the apparatus to perform:
  trigger the capacity evaluation upon detection of no user terminals currently being served by the base station.

23. The apparatus of claim 14, wherein the one or more memories and the computer program code are further configured, with the one or more processors, to cause the apparatus to perform:
  monitor in the stand-by mode communication interfaces of the base station for a reception of a triggering event triggering a transition from the stand-by mode to an operative mode, and to configure the base station to transit to the operative mode and to occupy said radio resource that defines the cell.

24. The apparatus of claim 14, wherein the one or more memories and the computer program code are further configured, with the one or more processors, to cause the apparatus to perform:
  prevent the base station from entering the stand-by mode, when measurement reports measured by user terminals indicate that the stand-by mode of the base station causes a gap in a coverage area of a base station network comprising said base station and said neighboring base stations.

25. The apparatus of claim 14, wherein the apparatus is said base station of the cellular radio access network.

26. An apparatus comprising:
  a capacity evaluation circuitry configured to evaluate a capacity metric of a base station of a cellular radio access network operating on a radio resource and capacity metrics of neighboring base stations, wherein the capacity metrics are evaluated for said radio resource; and a communication control circuitry configured, in response to detecting that the capacity of the base station is below a threshold calculated from the capacities of the neighboring base stations on said radio resource, to configure the base station to enter a stand-by mode and to release said radio resource that defines a cell associated with the base station so that the released radio resource becomes available for allocation to at least one of the neighboring base stations.

* * * * *

UNITED STATES PATENT AND TRADEMARK OFFICE
CERTIFICATE OF CORRECTION

| | | |
|---|---|---|
| PATENT NO. | : 8,913,575 B2 | Page 1 of 1 |
| APPLICATION NO. | : 13/639360 | |
| DATED | : December 16, 2014 | |
| INVENTOR(S) | : Pedersen et al. | |

It is certified that error appears in the above-identified patent and that said Letters Patent is hereby corrected as shown below:

IN THE CLAIMS:

Claim 14, col. 13, line 14 "to" should be deleted in front of "calculated".

Signed and Sealed this
Thirty-first Day of March, 2015

Michelle K. Lee
*Director of the United States Patent and Trademark Office*